United States Patent
Majumder

(10) Patent No.: US 10,411,472 B2
(45) Date of Patent: Sep. 10, 2019

(54) METHOD FOR CONTROLLING ELECTRICAL POWER IN A MICROGRID AND ARRANGEMENT COMPRISING DISTRIBUTED GENERATORS

(71) Applicant: ABB SCHWEIZ AG, Baden (CH)

(72) Inventor: Ritwik Majumder, Västerås (SE)

(73) Assignee: ABB SCHWEIZ AG, Baden (CH)

( * ) Notice: Subject to any disclaimer, the term of this patent is extended or adjusted under 35 U.S.C. 154(b) by 634 days.

(21) Appl. No.: 15/031,124

(22) PCT Filed: Oct. 22, 2013

(86) PCT No.: PCT/EP2013/072053
§ 371 (c)(1),
(2) Date: Apr. 21, 2016

(87) PCT Pub. No.: WO2015/058791
PCT Pub. Date: Apr. 30, 2015

(65) Prior Publication Data
US 2016/0285269 A1 Sep. 29, 2016

(51) Int. Cl.
*H02J 5/00* (2016.01)
*H01M 10/48* (2006.01)
(Continued)

(52) U.S. Cl.
CPC .......... *H02J 3/381* (2013.01); *H02J 3/16* (2013.01); *H02J 3/38* (2013.01); *Y02E 40/34* (2013.01); *Y02P 80/14* (2015.11)

(58) Field of Classification Search
CPC ..... H02J 3/381; H02J 3/16; H02J 3/38; Y02P 80/14; Y02E 40/34
See application file for complete search history.

(56) References Cited

U.S. PATENT DOCUMENTS 8,058,753 B2    11/2011  Achilles et al.
2005/0213272 A1*  9/2005  Kobayashi ............ H02M 7/493
                                                              361/62
(Continued)

FOREIGN PATENT DOCUMENTS

CN    102738786 A    10/2012
EP    0 805 753 A1   11/1997
(Continued)

OTHER PUBLICATIONS

Ahn et al., "Decentralized Voltage Control to Minimize Distribution Losses in an Islanded Microgrid", ASME 2012 5th Annual Dynamic Systems and Control Conference joint with the JSME 2012 11th Motion and Vibration Conference, Oct. 17-19, 2012, Fort Lauderdale, FL, USA, vol. 3: Renewable Energy Systems; Robotics; Robust Control; Single Track Vehicle Dynamics and Control; Stochastic Models, Control and Algorithms in Robotics; Structure Dynamics and Smart Structures, XP055221838, pp. 1-7.
(Continued)

*Primary Examiner* — Brandon S Cole
(74) *Attorney, Agent, or Firm* — Birch, Stewart, Kolasch & Birch, LLP

(57) ABSTRACT

A distributed method is provided for controlling electrical power in a microgrid, wherein a plurality of distributed generators supply electrical power to the microgrid, and each of the distributed generators is connected to a controller for controlling the real and reactive output power from the distributed generator. The method includes the steps of measuring, for each of the distributed generators, a voltage level at a measuring point associated with that distributed generator and forwarding the measured voltage level to the controller connected to that distributed generator; determining, for each of the controllers, a parameter value related to the received measured voltage level and/or related to a reactive current injection capacity of the distributed genera- (Continued)

tor connected to that controller; communicating, from each of the controllers, its determined parameter value to each other ones of the controllers; determining a sequential order in which the controllers are to control the distributed generators to inject reactive power into the microgrid based on the communicated parameter values; and controlling the distributed generators to inject reactive power into the microgrid by means of the controllers in the determined sequential order.

20 Claims, 3 Drawing Sheets

(51) Int. Cl.
*H02J 7/34* (2006.01)
*H02J 1/10* (2006.01)
*H02J 3/38* (2006.01)
*H02J 3/16* (2006.01)

(56) References Cited

U.S. PATENT DOCUMENTS

| | | | |
|---|---|---|---|
| 2011/0018353 A1* | 1/2011 | Yu | H02J 3/383 307/82 |
| 2011/0187109 A1 | 8/2011 | Ichinose et al. | |
| 2012/0143385 A1 | 6/2012 | Goldsmith | |
| 2013/0024032 A1 | 1/2013 | Vukojevic et al. | |
| 2013/0030599 A1 | 1/2013 | Milosevic et al. | |
| 2013/0131878 A1 | 5/2013 | Wilkins et al. | |
| 2013/0234696 A1 | 9/2013 | Bryson et al. | |
| 2014/0079960 A1* | 3/2014 | Yun | H02J 7/34 429/7 |
| 2016/0285269 A1* | 9/2016 | Majumder | H02J 3/16 |
| 2017/0047742 A1* | 2/2017 | Narla | H02J 3/385 |

FOREIGN PATENT DOCUMENTS

| | | |
|---|---|---|
| EP | 1 933 441 A1 | 6/2008 |
| EP | 2 518 853 A1 | 10/2012 |
| EP | 2 621 046 A1 | 7/2013 |
| WO | WO 96/13383 A1 | 5/1996 |

OTHER PUBLICATIONS

Deshmukh et al., "Voltage/VAR Control in Distribution Networks via Reactive Power Injection Through Distributed Generators", IEEE Transactions on Smart Grid, Sep. 2012, vol. 3, No. 3, XP002725854, pp. 1226-1234, Abstract.

Majumder et al., "Modeling, Stability Analysis and Control of Microgrid", Queensland University of Technology, Queensland, Australia, Feb. 28, 2010, XP055123241, pp. 1-182, the whole document.

Vovos et al., "Centralized and Distributed Voltage Control: Impact on Distributed Generation Penetration", IEEE Transactions on Power Systems, Feb. 2, 2007, vol. 22, No. 1, XP011161659, pp. 476-483, the whole document.

* cited by examiner

METHOD FOR CONTROLLING ELECTRICAL POWER IN A MICROGRID AND ARRANGEMENT COMPRISING DISTRIBUTED GENERATORS

TECHNICAL FIELD

The invention relates to a distributed method for controlling electrical power in a microgrid and to an arrangement comprising a plurality of distributed generators.

BACKGROUND

The main task of distributed generators in a microgrid is to deliver maximum real power to meet load demands. The system voltage is typically maintained by the main grid, to which it is connected. However, in weak grid and off grid operation, reactive power support from the distributed generators is required in many cases.

Various centralized control approaches for assigning real and reactive power references have been investigated.

EP 1933441 A1 discloses a system for controlling a microgrid including microgrid assets and a tieline for coupling the microgrid to a bulk grid; and a tieline controller coupled to the tieline. At least one of the microgrid assets comprises a different type of asset than another one of the microgrid assets. The tieline controller is configured for providing tieline control signals to adjust active and reactive power in respective microgrid assets in response to commands from the bulk grid operating entity, microgrid system conditions, bulk grid conditions, or combinations thereof.

EP 2518853 A1 discloses systems, methods, and apparatus for providing coordinated volt/VAR control in power distribution networks. According to an example embodiment of the invention, a method is provided for coordinating voltage and volt-amps-reactive (VAR) control (VVC) in power distribution networks. The method can include receiving one or more VVC objective functions from a distribution management system; determining at least one microgrid conservation voltage reduction factor (CVRF); forecasting microgrid load profile for a predetermined period of time; controlling microgrid VVC resources based at least on the one or more received VVC objective functions; and communicating the at least one microgrid CVRF and the forecasted load profile to the distribution management system.

SUMMARY

A problem of the centralized control approach is that a central control device has to be provided, adding costs to the control system. Further, a centralized control approach is complex and requires large amounts of control signaling.

Another problem of the centralized control approach is that when the central control device fails the entire control system may fail.

An aim of the present invention is to provide a control approach, which alleviates, or at least reduces, the above problems.

According to one aspect of the invention, there is provided a distributed method for controlling electrical power in a microgrid, wherein a plurality of distributed generators supply electrical power to the microgrid, and each of the distributed generators is connected to a controller, such as e.g. a controller of a voltage source converter, for controlling the real and reactive output power from the distributed generator. According to the method there is measured, for each of the distributed generators, a voltage level at a measuring point associated with that distributed generator and the measured voltage level is forwarded to the controller connected to that distributed generator. For each of the controllers, a parameter value related to the received measured voltage level and/or related to a reactive current injection capacity of the distributed generator connected to that controller is determined, and from each of the controllers, its determined parameter value is communicated to each other ones of the controllers. The reactive current injection capacity may be determined based on the measured voltage level, the real power injection, and/or the current limit.

In each of the controllers, a sequential order in which the controllers are to control the distributed generators to inject reactive power into the microgrid is determined based on the communicated parameter values. Alternatively, the sequential order in which the controllers are to control the distributed generators to inject reactive power into the microgrid based on the communicated parameter values is determined in at least one of the controllers, followed by communicating this sequential order to the other ones of the controllers.

Finally, the distributed generators are controlled to inject reactive power within their current limits into the microgrid by means of the controllers in the determined sequential order.

The distributed generators have capabilities for altering their real and reactive power output either by their inherent structure or by being equipped with arrangements such as e.g. voltages source converters.

The reactive power support from the distributed generators can be used both in weak microgrids connected to a main grid and in disconnected microgrids.

In one embodiment, the measuring point may, for each of the distributed generators, be at the connection point to the microgrid for that distributed generator.

In another embodiment, the measuring point may, for each of the distributed generators, be at a node neighbouring the connection point to the microgrid for that distributed generator.

In yet another embodiment, there may be measured, for each of the distributed generators, both a voltage level at the connection point to the microgrid for that distributed generator and at a node neighbouring the connection point, and both the measured voltage levels are forwarded to the controller connected to that distributed generator. The parameter value and/or control of each of the distributed generators may be based on one or both of the measure voltage levels for that distributed generator.

The parameter value may, for each of the controllers, be (i) the deviation of the received measured voltage level from a reference voltage, (ii) the reactive current injection capacity of the distributed generator connected to that controller, or (iii) a combination thereof. The reference voltage may be a desired voltage in the microgrid such as e.g. an acceptable minimum voltage.

In one embodiment, the controllers may be used to control the distributed generators to inject reactive power into the microgrid in a sequential order such that their parameter values are arranged in decreasing order.

In another embodiment, each of the distributed generators may be controlled to inject reactive power into the microgrid by means of the controller connected to that distributed generator to reduce or eliminate any deviation of the received measured voltage level from the reference voltage. In particular, each of the distributed generators may be controlled to inject reactive power into the microgrid by means of the controller connected to that distributed generator until any deviation of the received measured voltage level from the reference voltage has vanished or until a current limit of the distributed generator has been reached.

In yet another embodiment, an activation signal is sent from each of the controllers but the last one in the sequential order when the controller has finished controlling the distributed generator, to which it is connected, to inject reactive power into the microgrid. The activation signal may be sent to the next controller in the sequential order, which in response thereto starts controlling the distributed generator, to which it is connected, to inject reactive power into the microgrid.

The method of the first aspect of the invention may be initiated in response to an activation signal sent to the controllers from an external device or in response to an activation signal sent from one of the controllers to the other ones of the controllers. In particular, the method of the invention may be initiated in response to a deviation of a measured voltage level in said microgrid from the reference voltage.

According to another aspect of the invention there is provided an arrangement comprising a plurality of distributed generators for supplying electrical power to a microgrid, and for each of the distributed generators, a controller connected thereto for controlling the real and reactive output power from the distributed generator. The arrangement comprises further, for each of the distributed generators, a voltage sensor configured to measure a voltage level at a measuring point associated with that distributed generator and to forward the measured voltage level to the controller connected to that distributed generator. Each of the controllers is configured to determine a parameter value related to the received measured voltage level and/or related to a reactive current injection capacity of the distributed generator connected to that controller. Further, each of the controllers is configured to communicate its determined parameter value to each other ones of the controllers, and to determine a sequential order in which the controllers are to control the distributed generators to inject reactive power into the microgrid based on said communicated parameter values. Alternatively, at least one controller is configured to determine the sequential order in which the controllers are to control the distributed generators to inject reactive power into the microgrid based on the communicated parameter values, whereafter this sequential order is communicated to the other ones of the controllers.

The controllers are configured to control the distributed generators to inject reactive power into the microgrid in the determined sequential order.

The second aspect may be modified to comprise methods for performing any of the functions disclosed with respect to the first aspect.

The present invention provides a distributed or decentralized control approach, wherein the reactive power support comes from distributed power sources in a decentralized fashion. The distributed or decentralized control approach provides for simple, robust, reliable, and cost-efficient control of distributed generators connected to a microgrid.

Further characteristics of the invention and advantages thereof will be evident from the following detailed description of embodiments of the invention.

DETAILED DESCRIPTION

Figure 1:
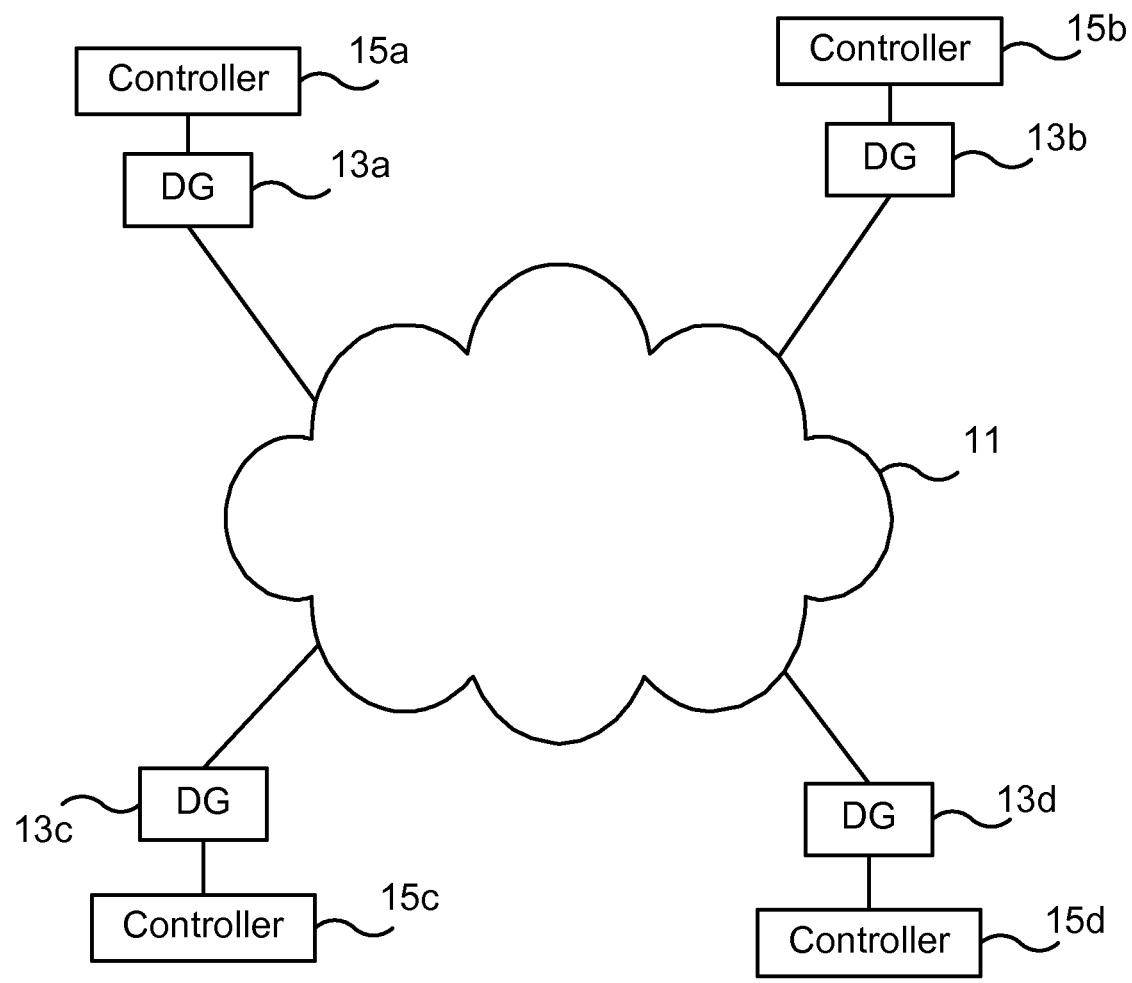
FIG. 1 illustrates schematically a plurality of distributed generator systems connected to a microgrid in accordance with an embodiment of the invention.

FIG. 1 illustrates schematically a plurality of distributed generator systems connected to a microgrid 11. Each of the distributed generator systems comprises a distributed generator 13a-d for supplying electrical power to the microgrid 11, and a controller 15a-d, such as e.g. a controller of a voltage source converter, connected to the distributed generator 13a-d for controlling the real and reactive output power from the distributed generator 13a-d. While FIG. 1 illustrates four generator systems, there is no limitation regarding this with respect to the invention; it is applicable to any configuration comprising at least two generator systems.

Each of the distributed generators has capability for altering its real and reactive power output either by its inherent structure or by being equipped with a power conversion arrangement such as e.g. a voltages source converter. Such arrangement, if required, is in the present description, assumed to be included in the distributed generator.

The controllers 15a-d are connected to one another in order to communicate with one another, either via broadcast, multicast, or unicast messages. Typically, each of the controllers 15a-d may broadcast real and reactive power outputs from the distributed generator 13a-d, to which it is connected. Further, each of the controllers 15a-d may receive voltage and device statuses from other devices connected in the microgrid 11.

Figure 2:
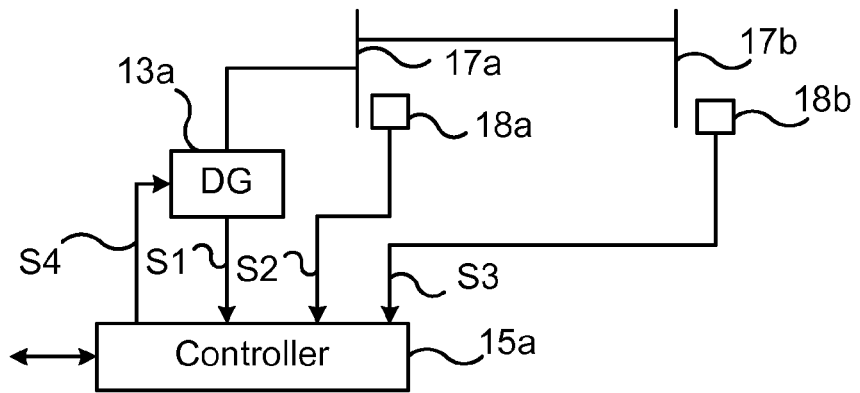
FIG. 2 illustrates schematically one of the distributed generator systems of FIG. 1 in more detail.

FIG. 2 illustrates schematically one of the distributed generator systems of FIG. 1 in more detail. It shall be appreciated that the other distributed generator systems are configured in a similar fashion.

At least one voltage sensor 18a, 18b is configured to measure a voltage level at a measuring point 17a, 17b associated with the distributed generator 13a and to forward the measured voltage level to the controller 15a connected to the distributed generator 13a via signal paths S2 and S3. In the illustrated case, two sensors 18a, 18b are connected at different measuring points: one measuring point is at the connection point 17a of the distributed generator 13a to the microgrid 11 and one measuring point is at neighbouring node 17b. The distributed generator 13a and the controller 15a may communicate with one another via signal paths S1 and S4. For instance, operation status parameters, such as available power and current limits may be communicated from the distributed generator 13a to the controller 15a, whereas control information such as recalculated real and reactive power references may be communicated from the controller 15a to the distributed generator 13a.

Each of the controllers 15a-d is configured to determine a parameter value related to a measured voltage level and/or related to a reactive current injection capacity of the distributed generator 13a-d connected to that controller 15a-d. If measured voltage levels are used for the determination of the parameter values, they may be measured at the connection points 17a of the distributed generators 13a-d or at neighbouring nodes 17b. If measurements are performed at both locations combinations of the measured voltage levels or the lowest measured voltage levels at each distributed generator 13a-d may be used. The reactive current injection capacity may be determined based on the measured voltage level, the real power injection, and the current limit.

The parameter value may, for each of the controllers 15a-d, be the deviation of the measured voltage level (or combination of measured voltage levels) from a reference voltage, the reactive current injection capacity of the distributed generator 13a-d connected to that controller 15a-d, or a combination thereof. The reference voltage may be a desired voltage in the microgrid such as e.g. an acceptable minimum voltage.

Each of the controllers 15a-d is configured to next communicate its determined parameter value to each other ones of the controllers 15a-d, e.g. via broadcast signaling, such that each controller 15a-d knows the parameter values for all the controllers 15a-d.

Each of the controllers 15a-d is configured to next determine a sequential order in which the controllers 15a-d are to control the distributed generators 13a-d to inject reactive power into the microgrid 11 based on the communicated parameter values. Each of the controllers 15a-d may be configured to then communicate its determined sequential order to each other ones of the controllers 15a-d to check that the sequential orders match one another.

Alternatively, at least one controller is configured to determine the sequential order in which the controllers are to control the distributed generators to inject reactive power into the microgrid based on the communicated parameter values, whereafter this sequential order is communicated to the other ones of the controllers.

Finally, the controllers 15a-d are configured to control the distributed generators 13a-d to inject reactive power into the microgrid in the determined sequential order. During such control, each of the controllers 15a-d may be configured to control the distributed generator 13a-d, to which it is connected, to inject reactive power into the microgrid 11 until any deviation of the measured voltage level (or combination of measured voltage levels) from the reference voltage has vanished or until a current limit of the distributed generator 13a-d has been reached.

The control of the distributed generators 13a-d to inject reactive power into the microgrid 11 to thereby change the local or nearby voltage level in the microgrid 11 may be performed in any manner known to a person skilled in the art.

The controllers 15a-d may be configured to control the distributed generators 13a-d to inject reactive power into the microgrid 11 in a sequential order, such that their parameter values are arranged in decreasing order.

Figure 3:
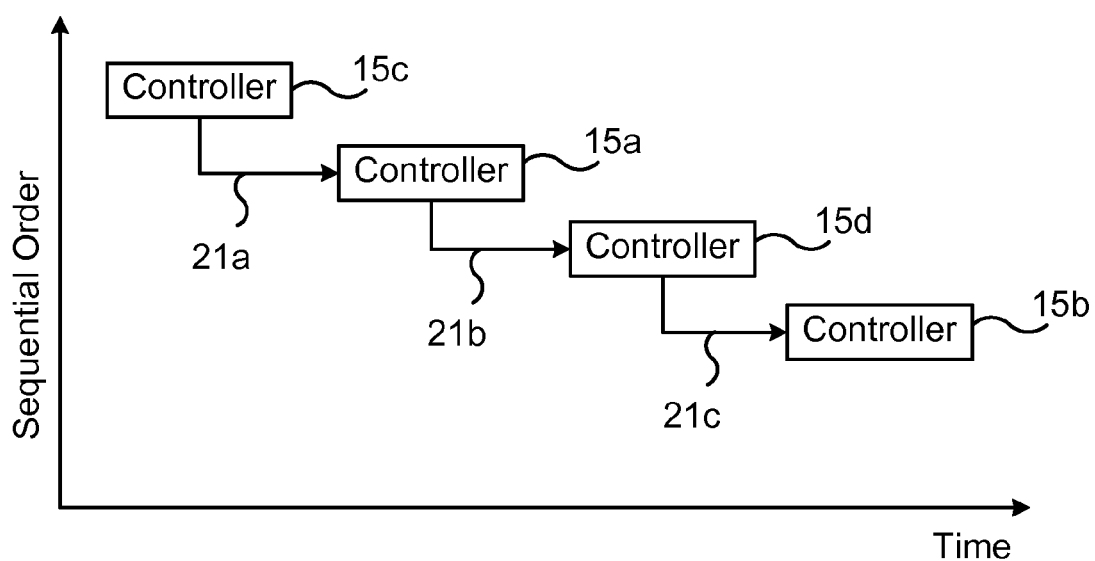
FIG. 3 illustrates schematically how the controllers of the distributed generator systems of FIG. 1 may be configured to control the distributed generators to inject reactive power into the microgrid in a determined sequential order.

FIG. 3 illustrates schematically how the controllers 15a-d of the distributed generator systems of FIG. 1 may be configured to control the distributed generators 13a-d to inject reactive power into the microgrid 11 in a determined sequential order according to an exemplary embodiment of the invention. Here, the controllers 15c, 15a, 15d and 15b have parameter values in a decreasing order, and the sequential order is thus 15c, 15a, 15d and 15b. The first controller in the sequential order, i.e. controller 15c may start controlling the distributed generator 13c, to which it is connected, to inject reactive power into the microgrid 11 as described above. Each of the controllers 15c, 15a, 15d but the last one 15b in the sequential order is configured to send an activation signal 21a, 21b, 21c when the controller 15c, 15a, 15d has finished controlling the distributed generator 13c, 13a, 13d, to which it is connected, to inject reactive power into the microgrid 11, wherein the activation signal 21a, 21b, 21c is sent to the next controller 15a, 15d, 15b in the sequential order, which in response thereto is configured to start controlling the distributed generator 13a, 13d, 13b, to which it is connected, to inject reactive power into the microgrid 11. The activation signals 21a, 21b, 21c may be broadcast whereupon the intended receiver can act on the signal (since all controllers 15a-d has knowledge of the sequential order). Signals may be broadcast from the first 15c and last 15b controller in the sequential order when the sequenced controlling as performed by the controllers in the sequential order is started and ended.

It shall be appreciated that any controller may at any time deactivate the above disclosed reactive power support control function and broadcast such information to the other controllers. Similarly, such controller having the reactive power support control function deactivated or a controller of a newly installed distributed generator system may at any time activate the reactive power support control function and broadcast such information to the other controllers.

In case, a controller is the sole responsible for determining the sequential order in which the controllers are to control the distributed generators to inject reactive power into the microgrid, and for communicating this sequential order to the other ones of the controllers, and desires to deactivate the above disclosed reactive power support control function, the above functions have to be handed over to one or more of the other controllers which has/have the reactive power support control function activated.

The invention refers also to a microgrid system comprising a microgrid and the distributed generator systems with the above disclosed reactive power support control function implemented.

Figure 4:
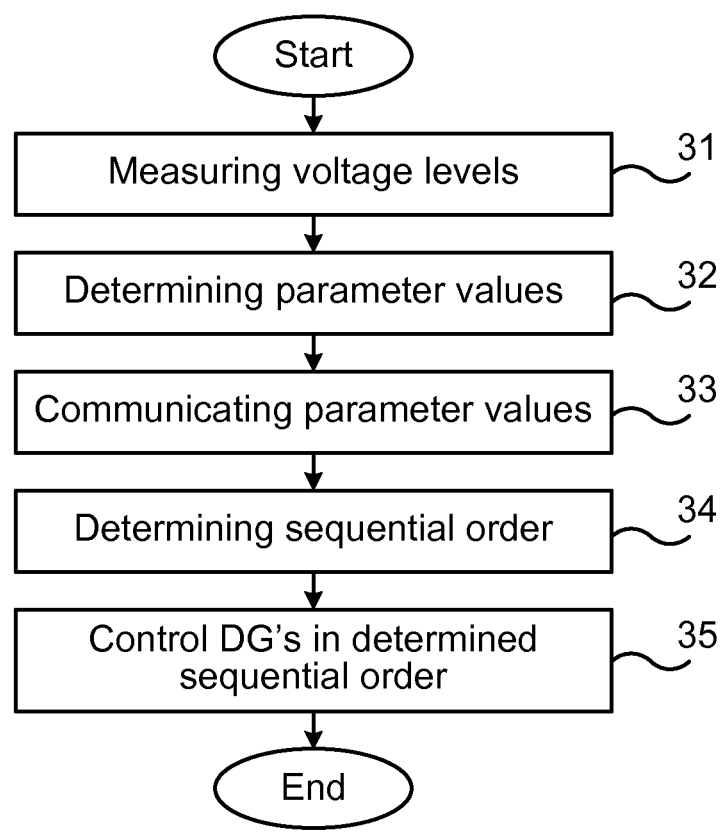
FIG. 4 illustrates schematically in a flow chart a method for controlling electrical power in a microgrid according to an embodiment of the invention.

FIG. 4 illustrates schematically in a flow chart a distributed method for controlling electrical power in a microgrid according to an embodiment of the invention. The method is implemented in a microgrid, wherein a plurality of distributed generators supply electrical power to the microgrid, and each of the distributed generators is connected to a controller for controlling the real and reactive output power from the distributed generator, e.g. as the microgrid and the distributed generator systems as disclosed with reference to FIGS. 1-3 above.

According to the method, there is, in a step 31, measured, for each of the distributed generators, a voltage level at a measuring point associated with that distributed generator wherein the measured voltage level is forwarded to the controller connected to that distributed generator. Next, in a step 32, there is determined, for each of the controllers, a parameter value related to the received measured voltage level and/or related to a reactive current injection capacity of the distributed generator connected to that controller. From each of the controllers, its determined parameter value is, in a step 33, communicated to each other ones of the controllers.

In each of the controllers, a sequential order in which the controllers are to control the distributed generators to inject reactive power into the microgrid is, in a step 34, determined based on said communicated parameter values. Alternatively, the sequential order in which the controllers are to control the distributed generators to inject reactive power into the microgrid based on the communicated parameter values, in step 34, is determined in at least one of the controllers, followed by communicating this sequential order to the other ones of the controllers.

Finally, the distributed generators are, in a step 35, controlled to inject reactive power into the microgrid by means of the controllers in the determined sequential order.

The described control method may be modified to include method steps using any of the devices, modules and/or arrangements as described above with respect to FIG. 1 to perform any of the disclosed functions.

The invention has mainly been described above with reference to a few embodiments. However, as is readily appreciated by a person skilled in the art, other embodiments than the ones disclosed above are equally possible within the scope of the invention, as defined by the appended patent claims. In particular, it shall be appreciated that the different embodiments, features, and alternatives disclosed above may be combined to reach yet further embodiments of the invention.

The invention claimed is:

1. A distributed method for controlling electrical power in a microgrid, wherein a plurality of distributed generators supply electrical power to the microgrid, and each of the distributed generators is connected to a controller for controlling the real and reactive output power from the distributed generator, the method comprising the steps of:
    measuring, for each of the distributed generators, a voltage level at a measuring point associated with that distributed generator and forwarding the measured voltage level to the controller connected to that distributed generator;
    determining, for each of the controllers, a parameter value related to the received measured voltage level and/or related to a reactive current injection capacity of the distributed generator connected to that controller;
    communicating, from each of the controllers, its determined parameter value to each other ones of the controllers;
    determining, in each of the controllers, a sequential order in which the controllers are to control the reactive output power from the distributed generators into the microgrid based on said communicated parameter values, or determining, in at least one of the controllers, a sequential order in which the controllers are to control the reactive output power from the distributed generators into the microgrid based on said communicated parameter values followed by communicating said sequential order to the other ones of the controllers; and
    controlling the reactive output power from the distributed generators into the microgrid by means of the controllers in the determined sequential order.

2. The method of claim 1, wherein said measuring point is, for each of the distributed generators, at the connection point to the microgrid for that distributed generator.

3. The method of claim 1, wherein said measuring point is, for each of the distributed generators, at a node neighbouring the connection point to the microgrid for that distributed generator.

4. The method of claim 1, wherein said parameter value is, for each of the controllers, the deviation of the received measured voltage level from a reference voltage, the reactive current injection capacity of the distributed generator connected to that controller, or a combination thereof.

5. The method of claim 1, wherein the controllers are to control the reactive output power from the distributed generators into the microgrid in a sequential order such that their parameter values are arranged in decreasing order.

6. The method of claim 1, wherein the reactive output power from each of the distributed generators into the microgrid is controlled by means of the controller connected to that distributed generator to reduce any deviation of the received measured voltage level from a reference voltage.

7. The method of claim 6, wherein the reactive output power from each of the distributed generators into the microgrid is controlled by means of the controller connected to that distributed generator until any deviation of the received measured voltage level from the reference voltage has vanished or until a current limit of the distributed generator has been reached.

8. The method of claim 1, wherein an activation signal is sent from each of the controllers but the last one in the sequential order when any deviation of the received measured voltage level from the reference voltage has vanished or a current limit of the distributed generator has been reached, wherein the activation signal is sent to the next controller in the sequential order, which in response thereto starts controlling the reactive output power from the distributed generator, to which it is connected, into the microgrid.

9. The method of claim 1, wherein the method is initiated in response to an activation signal sent to the controllers from an external device.

10. The method of claim 1, wherein the method is initiated in response to an activation signal sent from one of the controllers to the other ones of the controllers.

11. The method of claim 1, wherein the method is initiated in response to a deviation of a measured voltage level in said microgrid from a reference voltage.

12. The method of claim 1, wherein the distributed generators comprise voltage source converters and the controllers are controllers of the voltage source converters.

13. An arrangement comprising a plurality of distributed generators for supplying electrical power to a microgrid, and, for each of the distributed generators, a controller connected thereto for controlling the real and reactive output power from the distributed generator, the arrangement comprising:
    for each of the distributed generators, a voltage sensor configured to measure a voltage level at a measuring point associated with that distributed generator and to forward the measured voltage level to the controller connected to that distributed generator;
    each of the controllers is configured to determine a parameter value related to the received measured voltage level and/or related to a reactive current injection capacity of the distributed generator connected to that controller;
    each of the controllers is configured to communicate its determined parameter value to each other ones of the controllers;
    each of the controllers is configured to determine a sequential order in which the controllers are to control the reactive output power from the distributed generators into the microgrid based on said communicated parameter values, or at least one of the controllers is configured to determine a sequential order in which the controllers are to control the reactive output power from the distributed generators into the microgrid based on said communicated parameter values and to communicate said sequential order to the other ones of the controllers; and
    the controllers are configured to control the reactive output power from the distributed generators into the microgrid in the determined sequential order.

14. The arrangement of claim 13, wherein said measuring point is, for each of the distributed generators, at the connection point to the microgrid for that distributed generator or at a node neighbouring that connection point.

15. The arrangement of claim 13, wherein said parameter value is, for each of the controllers, the deviation of the received measured voltage level from a reference voltage, the reactive current injection capacity of the distributed generator connected to that controller, or a combination thereof.

16. The arrangement of claim 13, wherein the controllers are to control the reactive output power from the distributed generators into the microgrid in a sequential order, such that their parameter values are arranged in decreasing order.

17. The arrangement of claim 13, wherein each of the controllers is configured to control the reactive output power from the distributed generator, to which it is connected, into the microgrid until any deviation of the received measured voltage level from a reference voltage has vanished or until a current limit of the distributed generator has been reached.

18. The arrangement of claim 13, wherein each of the controllers but the last one in the sequential order is configured to send an activation signal when any deviation of the received measured voltage level from the reference voltage has vanished or a current limit of the distributed generator has been reached, wherein the activation signal is sent to the next controller in the sequential order, which in response thereto is configured to start controlling the reactive output power from the distributed generator, to which it is connected, into the microgrid.

19. The arrangement of claim 13, wherein the distributed generators comprise voltage source converters and the controllers are controllers of the voltage source converters.

20. A microgrid system comprising a microgrid and the arrangement of claim 13.

* * * * *